United States Patent
Lliorca

(10) Patent No.: US 9,616,793 B2
(45) Date of Patent: Apr. 11, 2017

(54) CUP HOLDER INSERT AND METHOD OF USE

(71) Applicant: Jamie A. Lliorca, Brownsburg, IN (US)

(72) Inventor: Jamie A. Lliorca, Brownsburg, IN (US)

(*) Notice: Subject to any disclaimer, the term of this patent is extended or adjusted under 35 U.S.C. 154(b) by 0 days.

(21) Appl. No.: 15/071,366

(22) Filed: Mar. 16, 2016

(65) Prior Publication Data
US 2016/0272100 A1    Sep. 22, 2016

Related U.S. Application Data

(60) Provisional application No. 62/133,651, filed on Mar. 16, 2015.

(51) Int. Cl.
*B60N 3/10* (2006.01)
*A47G 23/02* (2006.01)

(52) U.S. Cl.
CPC .......... *B60N 3/108* (2013.01); *A47G 23/02* (2013.01); *B60N 3/103* (2013.01)

(58) Field of Classification Search
CPC ........ B60N 3/108; B60N 3/103; A47G 23/02; A47G 23/016; B60R 11/022
USPC ............ 248/311.2, 300, 300.1, 205.1, 205.2; 224/281, 400; 297/188.14, 188.18, 297/188.01
See application file for complete search history.

(56) References Cited

U.S. PATENT DOCUMENTS

| | | | | |
|---|---|---|---|---|
| 5,249,770 A * | 10/1993 | Louthan | A47K 1/09 | 248/205.2 |
| 5,810,228 A * | 9/1998 | Brokering | B62J 11/00 | 224/414 |
| 6,245,114 B1 * | 6/2001 | Marron | A61F 2/588 | 623/33 |
| 6,408,552 B1 * | 6/2002 | Faulkner | A47C 7/62 | 297/188.14 |
| 8,047,493 B1 * | 11/2011 | Cohen | B62J 11/00 | 248/300 |
| 2010/0051633 A1 * | 3/2010 | Porte | A45C 5/14 | 220/737 |
| 2015/0001266 A1 * | 1/2015 | Pluta | B60R 11/02 | 224/281 |
| 2015/0164256 A1 * | 6/2015 | Helton | A47G 23/0216 | 220/738 |

* cited by examiner

*Primary Examiner* — Tan Le
(74) *Attorney, Agent, or Firm* — Bradshaw Law LLC

(57) ABSTRACT

A cup holder insert is provided that may be used whenever an undersized drink or container is placed into a cup holder and is not adequately secured. The insert is a unitary piece of material, such as plastic, having a pair of upper straps and a pair of lower wings. The insert secures itself within a cup holder by way of the expansion of the lower wings towards the inner diameter of the cup holder. A central portion of the insert spans between the upper straps and lower bands and prevents any lateral movement of the object or container placed within. The top bands are secured into a loop around the drink container by sliding one into the other and retain their shape by frictional engagement.

12 Claims, 3 Drawing Sheets

CUP HOLDER INSERT AND METHOD OF USE

RELATED APPLICATION DATA

This application claims the benefit of U.S. Provisional Application No. 62/133,651 filed Mar. 16, 2015, the disclosure of which is incorporated by reference.

BACKGROUND

The present invention relates to an insert for a vehicle's cup holder that helps secure bottles and cans placed therein.

Most modern vehicles are provided with cup holders, which are typically in the form of a generally cylindrical counter-sunk hole, for example, positioned in between the driver's and passenger's seats in an automobile. However, the sizes and/or depth of these holes are often inadequate to be able to securely retain the wide variety of sizes of containers that users place in them. Accordingly, a number of devices, known as "cup holder adapters" or "cup holder inserts" have been proposed which can be inserted into the cup holder in an effort to better accommodate different sized objects. Many of these known adapters and inserts are bulky, have moving parts, which are prone to jamming or malfunctioning, are over-priced, are not tall enough, and/or are limited to one diameter to keep drinks from tipping and spilling.

SUMMARY

One embodiment of the present invention is a unique cup-holder insert that can accommodate drink containers of varying shapes and sizes yet is simple to manufacture and use. In a preferred embodiment, the insert is made from a single sheet of resilient material (e.g. plastic or cardboard) and provides a relatively large amount of printable area that companies can use to imprint their logos or other marketing messages, rendering the insert valuable as a promotional product. Further embodiments, forms, objects, aspects, benefits, features, and advantages of the present application shall become apparent from the description and figures provided herewith.

BRIEF DESCRIPTION OF THE FIGURES

Features of the invention will be better understood from the following detailed description when considered in reference to the accompanying drawings, in which.

DETAILED DESCRIPTION OF REPRESENTATIVE EMBODIMENTS

Figure 1:
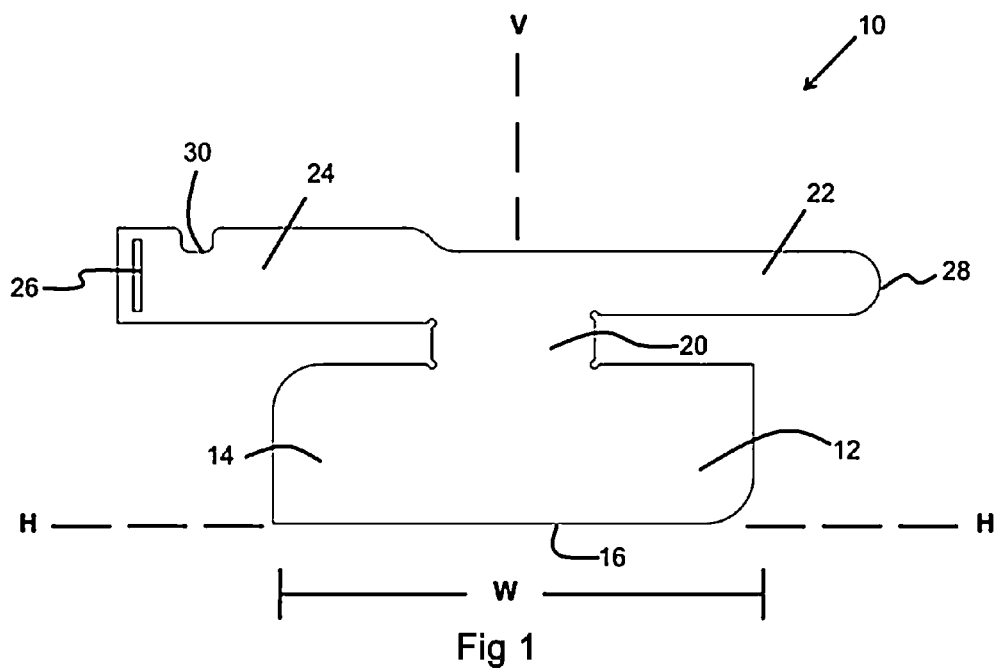
FIG. 1 is a plan view of a cup holder insert according to an embodiment.
Figure 2:
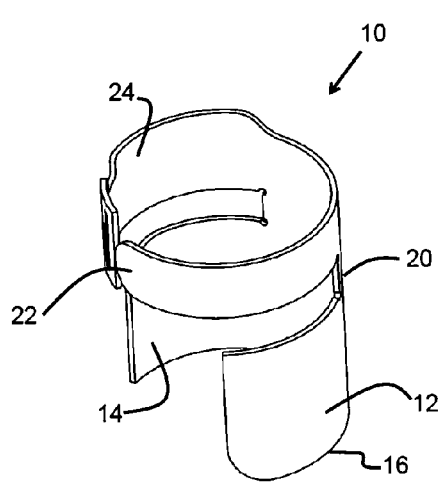
FIG. 2 is a perspective view of the FIG. 1 insert.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Figure 3:
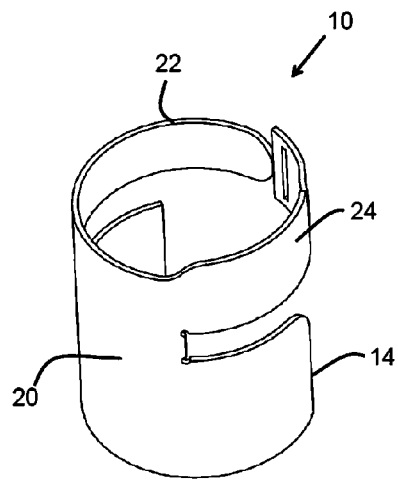
FIG. 3 is another perspective view of the FIG. 1 insert.
Figure 4:
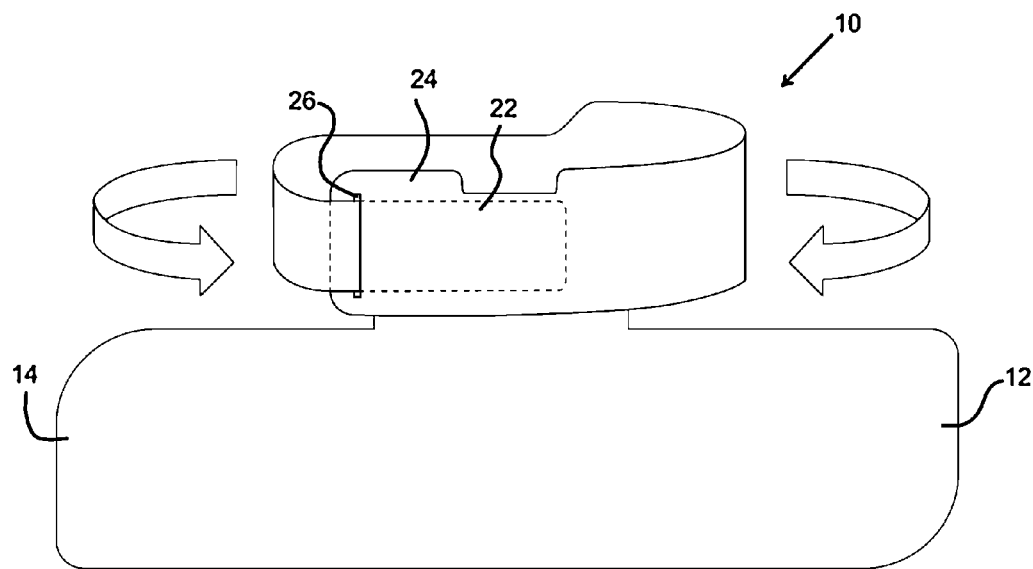
FIG. 4 is a front view of an insert with the upper straps formed into a loop to receive the drink holder, with arrows indicating the bending of the straps relative to the plan view of FIG. 1.
Figure 5:
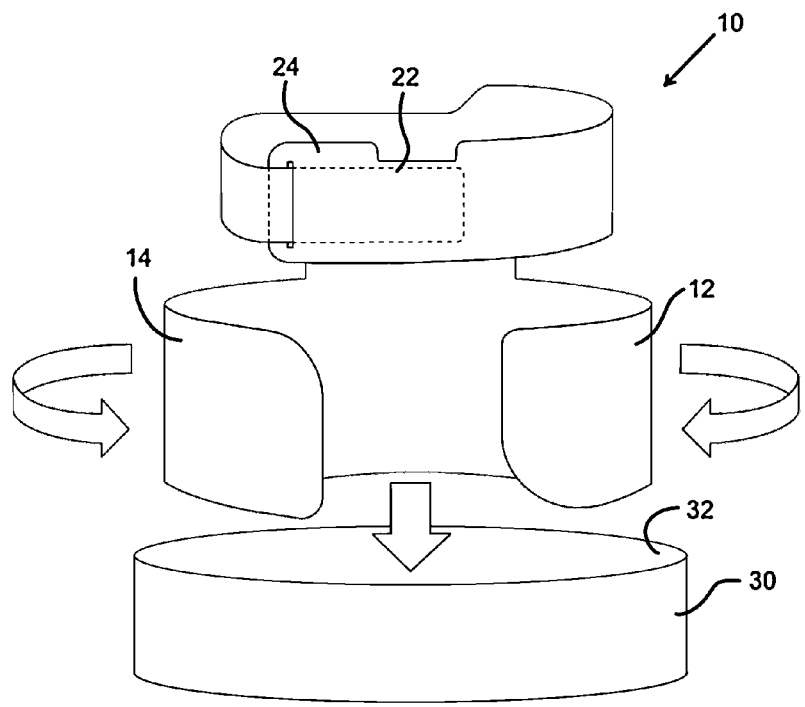
FIG. 5 is a front view of the FIG. 4 insert with the lower wings curved into a C-shape ready to be inserted into a vehicle's cup holder, with arrows indicating the bending of the lower wings and an arrow indicating the insertion of the insert into the cup holder.
Figure 6:
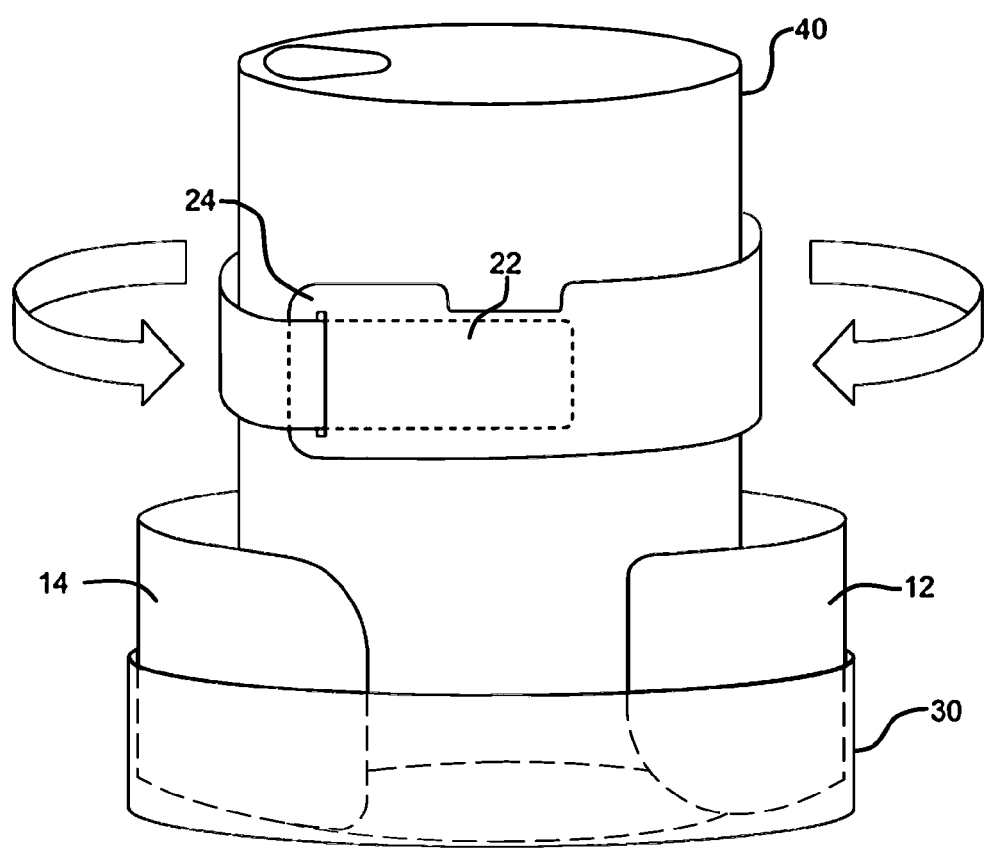
FIG. 6 is a front view of the FIG. 5 insert inserted into the vehicle's cup holder and holding a drink container.

The cup holder insert 10 is formed from a unitary piece of resilient material and is designed for placement within a generally cylindrical cup holder. Exemplary steps for using the insert to retain a beverage container 40 in a cup holder 30 are illustrated in FIGS. 3, 4, and 5.

The insert 10 includes a central portion 20 which, in use, extends vertically, as indicated by vertical axis V in FIG. 1. A pair of lower wings 12, 14 extend horizontally from the lower end of central portion 20 and define a horizontal lower edge 16, as indicated by horizontal axis H. The lower wings 12, 14 are sized and configured such that, when bent into a C-shape and then placed within a cylindrical cup holder 30, the lower wings 12, 14 expand outwardly towards the inner walls of the cylindrical cup holder 30 with the lower edge 16 against the bottom of the cup holder so as to form a base for the insert within the cup holder.

A pair of upper straps 22, 24 extend horizontally from the upper end of central portion 20. These upper straps 22, 24 are sized and configured to wrap around and retain an upper portion of a drink container 40 placed in the cup holder 30. The slot 26 on the outer end of the left side strap 24 receives the end 28 of the right side strap 22 and allows the straps to be adjusted to form a loop of any desired size. The straps 22, 24 retain their desired loop size based on frictional engagement. The left side strap 24 is wider than the right side strap 22 and is provided with cutout 30 in its upper surface. This cutout 30 provides a location for the user to more easily grip the drink container 40 from above when the user wants to remove the drink container from the insert 10, for example to take a drink from it.

In use, the lower (thicker in height) bands or wings 12, 14 may be squeezed to form a "c", lowered into and placed into the cup-holder 30 (or other recessed or counter-sunk hole), and then released. The wings 12, 14 are self-tensioning or self expanding and will expand so as to bias the outside of the wings 12, 14 towards the inner surface 32 of the cup holder 30, creating tension to hold the insert 10 in place. Next, the user may lower a standard drink container 40 (such as a soda can) into the insert 10 and wrap the top bands 22, 24 around the drink container, sliding the smaller (rounded end) band 22 into the thicker band 24 with pre-cut slot 26 to interlock, squeezing the bands to conform the top bands 22, 24 around the drink container 40. The top bands 22, 24 will now (through outward tension/frictional engagement) hold to the desired diameter, until manually released or pulled, to allow for easy removal and re-entry of the drink container. Alternatively, a user may form the top bands 22, 24 into a relatively large diameter loop prior to insertion of the drink container 40 into the insert 10 (and/or prior to insertion of insert 10 into the cup holder 30), and then tighten the bands around the drink container 40 afterwards to secure the drink container 40 in the insert 10.

The insert 10 is made from a single piece of material, such as plastic or cardboard, and is thin, easy to use, easy to store, and/or disposable when not in use or necessary. The insert also preferably provides surface area that may be imprinted with company logos and the like, making it useful as a promotional item. In one form, the insert 10 is made by cutting the desired shape from a single sheet of plastic, such as an HDPE or a LDPE (high or low density polyethylene, respectively), having a thickness of about 0.1 inches. In one form, the insert may be formed from the same sheets of material used to create flexible plastic cutting boards.

The insert is tall enough to keep conventional drink containers, such as plastic bottle, cup, aluminum can, glass bottle, styrofoam cups, from tipping, moving, sliding, or falling out. Its design is quick to adjust to the diameters of most sizes currently sold.

It is to be understood that the thicker bottom bands/wings are designed to create outward tension when curved into a C-shape (as viewed in along the vertical axis V in FIG. 1) and placed in a conventional cup holder. The vertical riser/central portion 20 prevents lateral movement. The small cut out holes shown in the corners where the wings 12, 14 and straps 22, 24 extend from the central portion facilitate bending without tearing. The top bands/straps 22, 24 wrap to secure the drink container 40. The smaller top band 22 slides into and interlocks by tension with the larger top band 24, holding a loop shape after the drink container is removed.

The lower wings 12, 14 are preferably sized so as to fit in standard sized cup holders of automobiles. Preferably the horizontal extent or width (W, as shown in FIG. 1) of the lower wings is between about 6 and about 11 inches, more preferably between 7 and 10 inches, or between 8 and 9 inches, or about 8.5 inches. The vertical rise of the lower wings 12, 14 (the vertical dimension, as shown in FIG. 1) is preferably in the range of about 1 to about 4 inches, more preferably between 1.5 and 3.3 inches, or between 2 and 3 inches, for example about 2.25 or about 2.5 inches.

The corresponding horizontal extent of the upper straps is preferably in the range of 8 to 14 inches, for example between about 9 and 13 inches, or about 11.5 to 12 inches. The overall height of the insert (i.e. the vertical dimension as shown in FIG. 1) is preferably in the range of 3 to 5 inches, for example about 4 inches.

In the illustrated embodiment, the central portion 20 is shown as a solid, uninterrupted section of material connecting the upper straps 22, 24 and the lower wings 12, 14. This central portion 20, together with the upper straps 22, 24 and lower wings 12, 14 provides a relatively large amount of printable surface area on which a company may imprint its logo or other marketing message, thus making the insert 10 useful as a promotional product. In embodiments where this large amount of printable able surface area is not needed or desired, the central portion 20 may be in the form of any number of smaller connecting sections connecting the upper straps to the lower wings.

It is be understood that what has been described includes a novel cup holder insert (10) formed from a unitary piece of resilient material. The insert is designed for placement within a generally cylindrical cup holder (30). The insert comprises a vertically extending central portion (20), a pair of lower wings (12, 14), and a pair of upper straps (22, 24). The lower wings (12, 14) extend horizontally from the central portion (20) and are sized and configured such that, when curved and placed within the cup holder (30), the lower wings expand outwardly towards the inner walls (32) of the cup holder (30) so as to form a base for the insert within the cup holder. The upper straps (22, 24) extend horizontally from the central portion and are sized and configured to wrap around and retain an upper portion of a drink container (40) placed in the cup holder (30). The resilient material may be plastic, such as a high density polyethylene. The base formed by the lower wings may be generally C shaped, and the lower wings may define a C shaped horizontal lower edge when placed in the cup holder. The vertically extending central portion may comprise a single continuous section of material spanning between the lower wings and the upper straps, or it may comprise a plurality of sections of material spanning between the lower wings and the upper straps.

The insert (10) is preferably used to retainer a drink container (40) in a cup holder (30), with the upper straps of the insert forming a loop around the drink container and the lower wings of the insert forming a C shaped base for the insert within the cup holder. The cup holder is preferably a vehicle cup holder, such as an automobile cup holder. The drink container may be a beverage bottle or beverage can.

In another preferred form, one of the upper straps includes a slot through which the other upper strap is inserted so as to form a loop for surrounding the drink container. The size and configuration of the slots and straps are such that the loop retains its shape by way of frictional engagement.

A novel method of using a cup holder insert is also provided. The method involves placing the lower wings of the insert into the cup holder, which is preferably done by first bending the wings into a C shape and then lowering the wings into the cup holder. After this, the user allows the lower wings to expand within the cup holder so as to retain the insert in the cup holder. The user forms a loop with the upper straps of the insert, for example by placing end 28 into slot 26. This loop may be formed before or after placing the insert into the cup holder. The user places a drink container in the insert-containing cup holder, and then uses the loop formed by the upper straps to hold the drink container in the insert-containing cup holder.

While embodiment of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

What is claimed is:

1. A cup holder insert formed from a unitary piece of resilient material for placement within a generally cylindrical cup holder, the insert comprising:
   a vertically extending central portion;
   a pair of lower wings extending horizontally from the central portion and being sized and configured such that, when curved and placed within the cup holder, the lower wings expand outwardly towards the inner walls of the cup holder so as to form a base for the insert within the cup holder;
   a pair of upper straps extending horizontally from the central portion and being sized and configured to wrap around and retain an upper portion of a drink container placed in the cup holder;
   wherein the insert has been placed within a cup holder and is being used to retain a drink container in the cup holder, wherein the upper straps of the insert form a loop around the drink container and the lower wings of the insert form a C shaped base for the insert within the cup holder.

2. The insert of claim 1 in which the resilient material is plastic.

3. The insert of claim 2 in which the plastic is a high density polyethylene.

4. The insert of claim 1 in which the lower wings define a C shaped horizontal lower edge in the cup holder.

5. The insert of claim 4 in which the vertically extending central portion comprises a single continuous section of material spanning between the lower wings and the upper straps.

6. The insert of claim 4 in which the vertically extending central portion comprises a plurality of sections of material spanning between the lower wings and the upper straps.

7. The insert of claim 1 in which the insert has been placed within an automobile cup holder.

8. The insert of claim 7 in which the drink container is a beverage bottle or beverage can.

9. The insert of claim 1 in which one of the upper straps includes a slot through which the other upper strap is inserted so as to form the loop surrounding the drink container.

10. A method of retaining a drink container in a cup holder, comprising:
   providing a cup holder insert according to claim 1;
   placing the lower wings of the insert into the cup holder;
   allowing the lower wings to expand within the cup holder so as to retain the insert in the cup holder;
   forming a loop with the upper straps of the insert;
   providing a drink container in the insert-containing cup holder; and
   using the loop formed by the upper straps to hold the drink container in the insert-containing cup holder.

11. The method of claim 10 in which the cup holder is a vehicle's cup holder.

12. The method of claim 10 in which the drink container is a beverage bottle or beverage can.

* * * * *